US009767282B2

(12) United States Patent
Reasor et al.

(10) Patent No.: US 9,767,282 B2
(45) Date of Patent: Sep. 19, 2017

(54) OFFLINE SCAN, CLEAN AND TELEMETRY USING INSTALLED ANTIMALWARE PROTECTION COMPONENTS

(75) Inventors: Sterling M. Reasor, Bellevue, WA (US); Kumi N. Hilwa, Redmond, WA (US); Eddy S. Hsia, Sammamish, WA (US); Santanu Chakraborty, Redmond, WA (US); Joseph Leo Faulhaber, Bozeman, MT (US); Vishal Kapoor, Seattle, WA (US); Michael Sean Jarrett, Kirkland, WA (US); Charles Turner, Redmond, WA (US); Jeremy D. Croy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 506 days.

(21) Appl. No.: 12/967,596

(22) Filed: Dec. 14, 2010

(65) Prior Publication Data

US 2012/0151582 A1    Jun. 14, 2012

(51) Int. Cl.
*G06F 21/56* (2013.01)

(52) U.S. Cl.
CPC .......... *G06F 21/564* (2013.01); *G06F 21/565* (2013.01); *G06F 21/568* (2013.01)

(58) Field of Classification Search
CPC . H04L 29/06891; H04L 9/3247; G06F 21/56; G06F 11/1446; G06F 21/564; G06F 21/568; Y10S 707/99931
USPC .......... 709/202; 713/188–189; 717/168, 174; 726/22, 26
See application file for complete search history.

(56) References Cited

U.S. PATENT DOCUMENTS

| 5,121,345 | A | * | 6/1992 | Lentz | ............................ 713/188 |
| 7,640,583 | B1 |   | 12/2009 | Marinescu | |
| 8,272,058 | B2 | * | 9/2012 | Brennan | ................. G06F 21/55 713/187 |
| 2007/0113062 | A1 |  | 5/2007 | Osburn | |
| 2008/0134335 | A1 | * | 6/2008 | Kameda | .................. G06F 21/56 726/24 |

(Continued)

OTHER PUBLICATIONS

Vegge et al. "An Empirical Study on the Prevalence of Zero-Day Malware", 4th International Conference on Internet Montoring and Protection (ICIMP 2009), Venice/Mestre, Italy: IEEE Computer Society, May 24-28, 2009.*

(Continued)

*Primary Examiner* — Tae Kim
*Assistant Examiner* — Shiuh-Huei Ku

(57) ABSTRACT

The subject disclosure relates to antimalware scanning, and more particularly to offline antimalware scanning of a host environment via an alternate, known safe operating system. An offline scanning product obtains data previously written by the host environment online antimalware scanning tool, e.g., configuration data and antimalware signatures in shared data stores accessible to the offline and online products, and uses that data to perform the offline antimalware scan. The offline scanning product writes results information and any quarantined files to other shared data stores, whereby the online environment, when rebooted, has access to the information, such as for review and to upload telemetry information to an online service for analysis. Also described is offline replacement of operating system files that cannot be cleaned or removed when online.

20 Claims, 5 Drawing Sheets

(56) References Cited

U.S. PATENT DOCUMENTS

2008/0263658 A1    10/2008  Michael
2009/0199297 A1     8/2009  Jarrett
2010/0077481 A1     3/2010  Polyakov
2010/0192227 A1     7/2010  Dai
2011/0321040 A1*   12/2011  Sobel et al. ..................... 718/1

OTHER PUBLICATIONS

"Automatic Generation of Remediation Procedures for Malware Infections", Retrieved on: Aug. 11, 2010, Available http://people.csail.mit.edu/costan/readings/usenix_papers/Paleari.pdf.

"WebCop: Locating Neighborhoods of Malware on the Web", Retrieved on: Retrieved on Aug. 11, 2010; Available at: https://www.usenix.org/events/leet10/tech/full_papers/Stokes.pdf.

* cited by examiner

OFFLINE SCAN, CLEAN AND TELEMETRY USING INSTALLED ANTIMALWARE PROTECTION COMPONENTS

BACKGROUND

Malicious computer software, or malware (including viruses, worms, rootkits, trojan horses, spyware and so forth), continues to evolve. As malware becomes more sophisticated, the malware becomes more difficult to remove from an infected computer system. For example, some malware may be able to change operating system components, malware scanning programs, signatures and so forth to avoid detection by antimalware protection products.

One existing antimalware tool allows the user to boot to an alternate, safe "offline" operating system, e.g., from a DVD-ROM, CD-ROM, USB drive or other media. From this alternate operating system, an offline antimalware tool scans the various host environment-accessible files (e.g., on the hard drive) when the host operating system is not running, and cleans or removes any detected malware files. Basically, because the likely infected host operating system is not running, any infecting malware code is also not running, whereby it is not possible for the infecting programs to conceal themselves. This makes it much easier for the offline tool to detect and clean infections.

While this offline scanning tool works very well, there are some limitations with it. For one, there is no communication between the offline tool and any online antimalware product that is installed, which may be confusing to the user and may lead to the offline product not being used appropriately. For another, there is typically no network access while in the offline scanning state, which means that the user is responsible for separately transferring data such as antimalware signatures between a network (e.g., the internet) and the media accessible to the offline components. Any improvements to antimalware scanning for malware detection and protection are desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an offline antimalware product (e.g., tool) running in an offline environment in which a host operating system is not running uses data previously provided by an online program (e.g., an online antimalware tool) to enhance the offline scan. This may include reading configuration data, settings data and/or antimalware signatures that are used to perform the offline scan and remediation. The offline product writes information related to results of the offline scanning into storage locations that are accessible to an online program when the host operating system is later running. The offline program may also quarantine files in a location accessible to the host environment when it is later running. The online program may use this data as desired, e.g., merge historical results, upload telemetry data to an internet security service, and so on.

In one implementation, the offline antimalware product is further configured to restore an operating system file that is detected to be infected. To this end, if the file is one which cannot be cleaned, removed or quarantined, (e.g., because doing so would prevent the host operating system from later running, the file is replaced with a known clean copy.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an offline scanning tool that works in conjunction with host ("online" as used herein, even if not currently running) antimalware components to enhance usage of the offline tool. Such online components include the protection program, data and/or data stores. In general, the offline antimalware product uses the data and data stores of another program (e.g., an online antimalware product) in order to scan, and as necessary clean, remove or quarantine files of an infected computer system, in a manner that is fast, efficient and significantly improves usability, yet remains secure.

In one aspect, the offline tool is configured to use an existing online-provided signature set that may be updated when the online host environment is running. Further, any files that are quarantined offline are held in a location accessible to the online host environment, e.g., in the online host operating system's program space. Still further, telemetry data and remediation history are similarly maintained in a location accessible to the online host environment, e.g., the same program space, whereby such information may be collected over a network connection (e.g. the internet) once the computer system is cleaned and rebooted into the normal host operating system environment. In addition, after the scan is complete, the offline scanning tool can use a communication channel to signal the online scanning product, when it comes up, that an offline scan has been successfully conducted. When next rebooted, the host operating system program may use this and/or other information to send telemetry and to display results of the offline scan.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computer security and malware protection in general.

Figure 1:
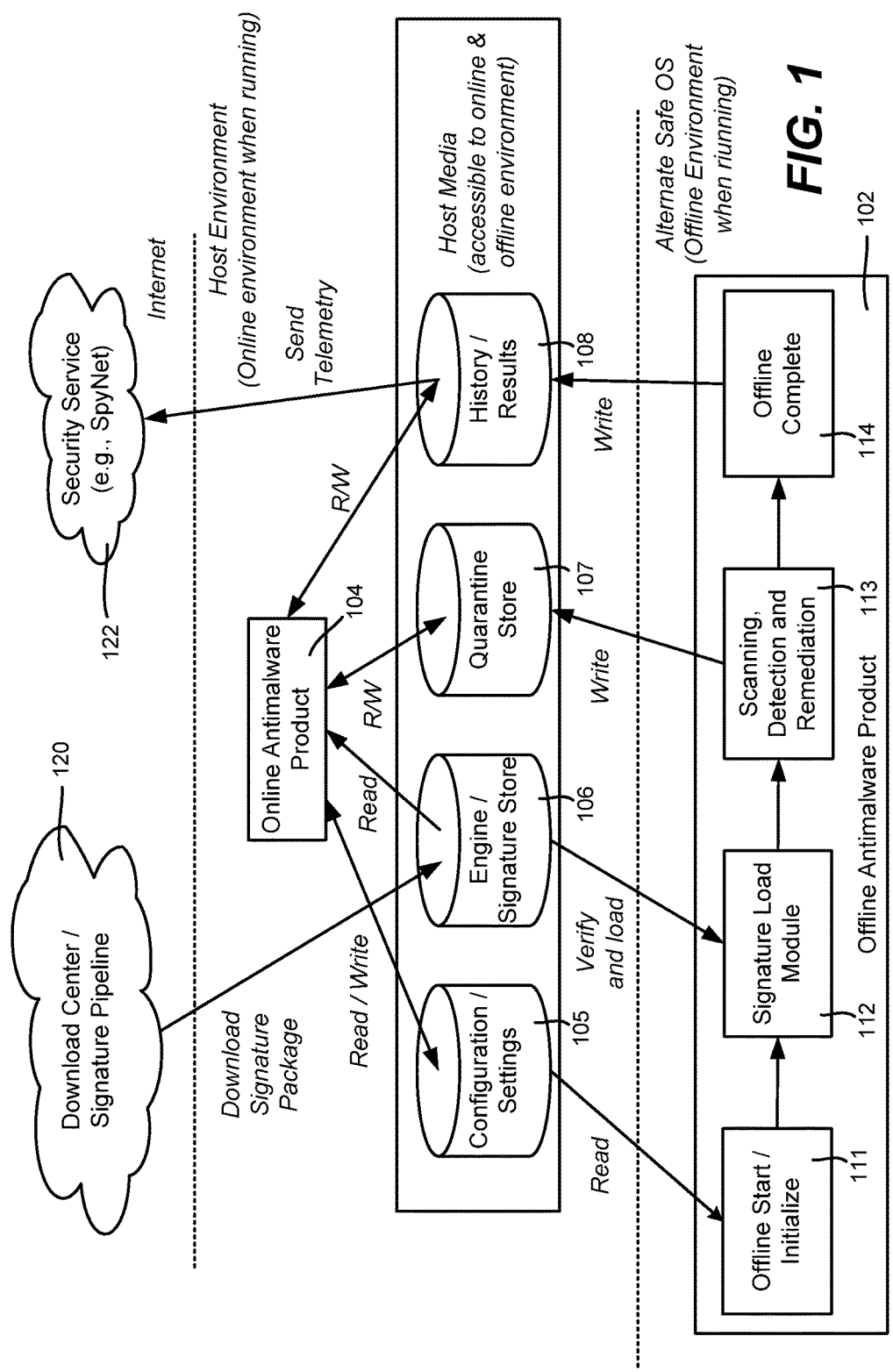
FIG. 1 is a block diagram representing example components of offline and online environments for scanning for antimalware, including a communication channel between environments.

FIG. 1 shows example components of a computing environment configured with an offline antimalware product 102 (including an offline program) that is able to communicate and leverage parts of an online antimalware product 104 via various data and data store components, including when the online antimalware product 104 its host operating system are not running. The offline antimalware product 102 may be maintained on any bootable media that boots up the safe operating system, such as a USB drive, a DVD-ROM, CD-ROM, separate hard disk partition, removable hard disk, and so forth, or any media accessible to the bootable media.

In one example implementation, the communication channel between online and offline states is accomplished via various data stores 105-108, although as can be readily appreciated, communication channels other than those exemplified may be used. Examples include "cloud" or other network storage (in the event the offline environment has appropriate network access), or any other shared media. In general, any such communication channel needs to persist the data because communication is between the offline product 102 and the online product 104, which typically do not run at the same time. Thus, the storage locations may be anywhere accessible to the host environment and the offline environment, which may be on the same storage media in different locations thereof, or on different locations on different storage media, or some combination thereof.

Via the configuration/settings data store 105, the offline antimalware product 102 may run according to information provided by the online antimalware product 104, including for example a malware exclusion list. A typical location for at least part of the configuration/settings data store 105 is the system registry of the host environment. For example, this may include the location of the other data stores 106-108 (e.g., quarantine, history, support log and so forth), what folders or files to scan, and any other data (e.g., clean, remove, quarantine) as appropriate. Note however that various protection mechanisms (e.g., signatures and overrides) may be used by the offline antimalware product 102 to ensure that malware has not tampered with the configuration/settings so as to avoid detection during an offline scan.

As represented in FIG. 1 via block 111, the offline antimalware product 102 reads the configuration/settings data store 105 at program startup, and may perform any initialization operations as desired. For example, initialization may include determining which host operating system and/or version is installed. The initialization may also ignore, change and/or override any configuration/settings in the data store 105, such as to ensure that certain files (e.g., operating system files) are scanned or signature checked even if the online product does not specify doing so.

As described herein, one benefit of the scanning technology is the ability for the offline product 102 to use antimalware engines/signatures that are downloaded (e.g., regularly) to an engine/signature store 106, e.g., from a download center/signature pipeline 120. This is represented by the (offline) signature load module 112 verifying and loading the signatures from the engine/signature store 106. As can be readily appreciated, this communication channel avoids the need for a user or service to update the frequently-changing signatures on the offline media, such as by copying them to a USB drive before a USB scan, burning or providing a new DVD-ROM or CD-ROM, and so forth. Note that known technology exists by which the offline product 102 is able to verify the integrity of the data accessed in the engine/signature store 106, e.g., via a digital signature of the signatures.

Scanning, detection and remediation are represented in FIG. 1 via block 113, which are performed in a generally known manner. However, unlike prior technology, when the offline product 102 wants to quarantine a file, the file is able to be stored into a host operating system-accessible quarantine cache/data store 107. This allows the user to restore any quarantined files via the offline product 102 or via the host operating system when it is later running. Note that files still may be removed/cleaned rather than quarantined by the offline product 102; the configuration/settings data may determine which actions to take, e.g., by default or user preferences, which may vary by file type or other information, infection type, and so on.

Figure 2:
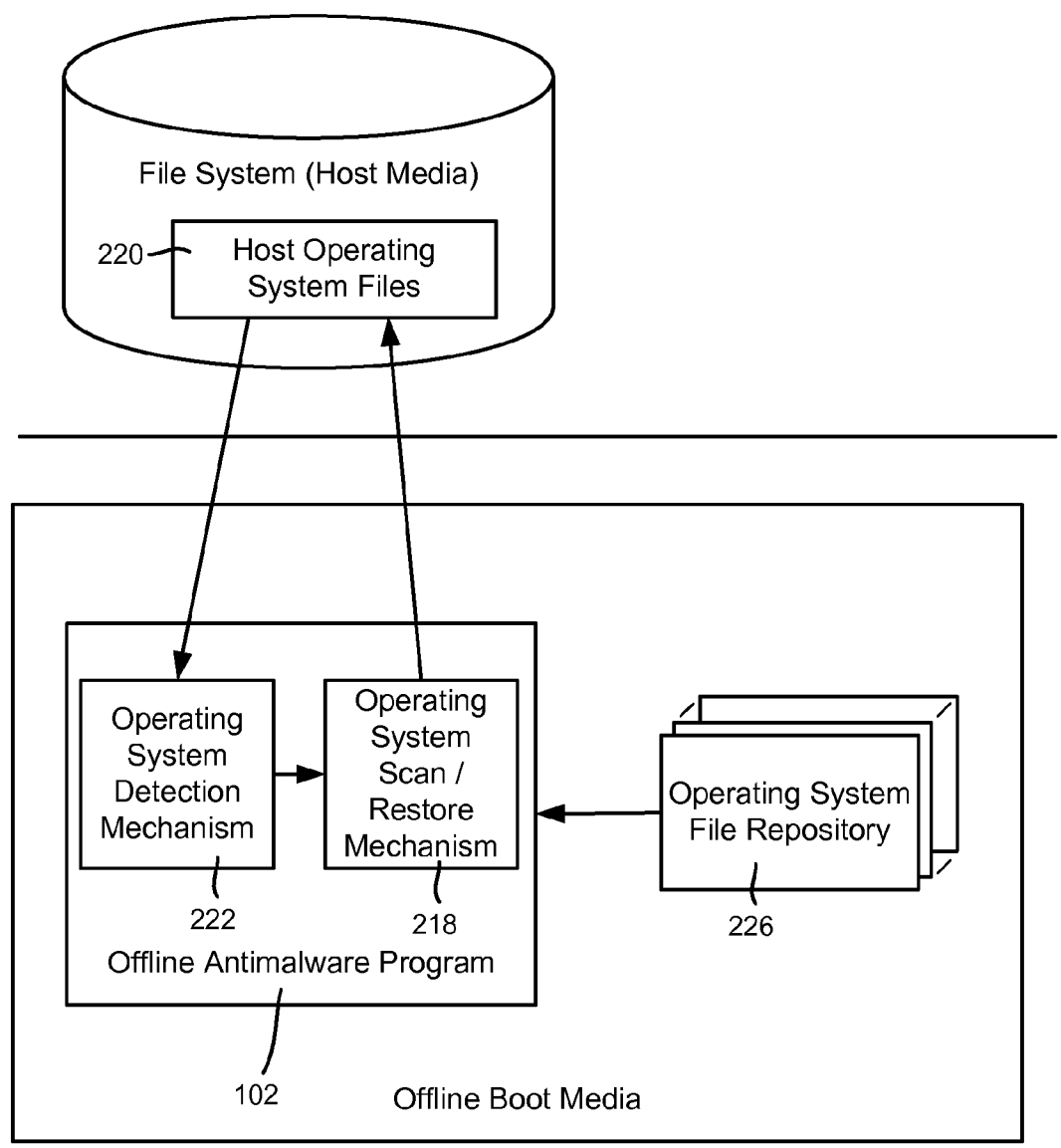
FIG. 2 is a block diagram representing example components for offline restoration of operating system files.

As part of scanning, an operating system file that is needed to run the operating system may be detected as being infected in a way that cannot be cleaned. Such a file cannot be removed either, because doing so would make the host operating system unable to run when later booted. To resolve this issue, as generally represented in FIG. 2, the offline antimalware program 102 (or a separate offline program) may include an operating system restore mechanism 218 that scans the operating system files 220 (or a subset thereof) and restores any infected operating system files to their uninfected state.

In an implementation in which the offline product 102 supports multiple operating systems and/or versions thereof, the operating system type and/or version is detected by an operating system detection mechanism 222, e.g., in a known manner. Any infected file or files are replaced with the proper operating system version's file or files maintained in a repository 226 on (or accessible to) the offline media, whereby the host operating system is thus restored for its next boot. Note that the replaced files may be saved for user in later analysis, as described below. Further note that the known good files for an operating system version may be maintained on any media, including the file system of the host media, as long as the files for the correct operating system version are available, and that their integrity is verifiable.

Returning to FIG. 1, when the offline scan is complete as represented by block 114, scanning-related telemetry data and other scanning-related (e.g., history) data may be written by the offline program to a history/results data store 108, such as to one or more file system files. This allows the online antimalware product 104 to detect that an offline scan has been performed (e.g., by data written to the system registry), as well as for the product 104 or another program to analyze the history of actions were taken during the offline scan. Further, because the host online operating system typically has network access, the telemetry data (e.g., a small file that may be a subset of the history) may be uploaded to a security service such as Microsoft® SpyNet, where information about any detected malware may be distributed, analyzed and so forth. A copy of any infected file or part of a file may also be sent for analysis. The online product 104 can provide messages to the user and also perform other operations on behalf of the offline product 102.

Another benefit of the integration between the online and offline antimalware products relates to ease of use. The online antimalware or other program can recommend that the user perform an offline scan, including providing instructions for what to do, such as when the online program cannot resolve an infection (e.g., clean or remove an operating system file). An offline scan may be scheduled, such as by having the offline product maintained on a different partition of the physical hard drive and having the system BIOS or the like regularly boot to that hard drive according to a schedule. An administrator policy may set such rules. Moreover, after the scan is finished, the user can be provided with actionable information regarding the results of the scan; note that the offline operating system may not have the richness of the user interface of the host operating system).

Figure 3:
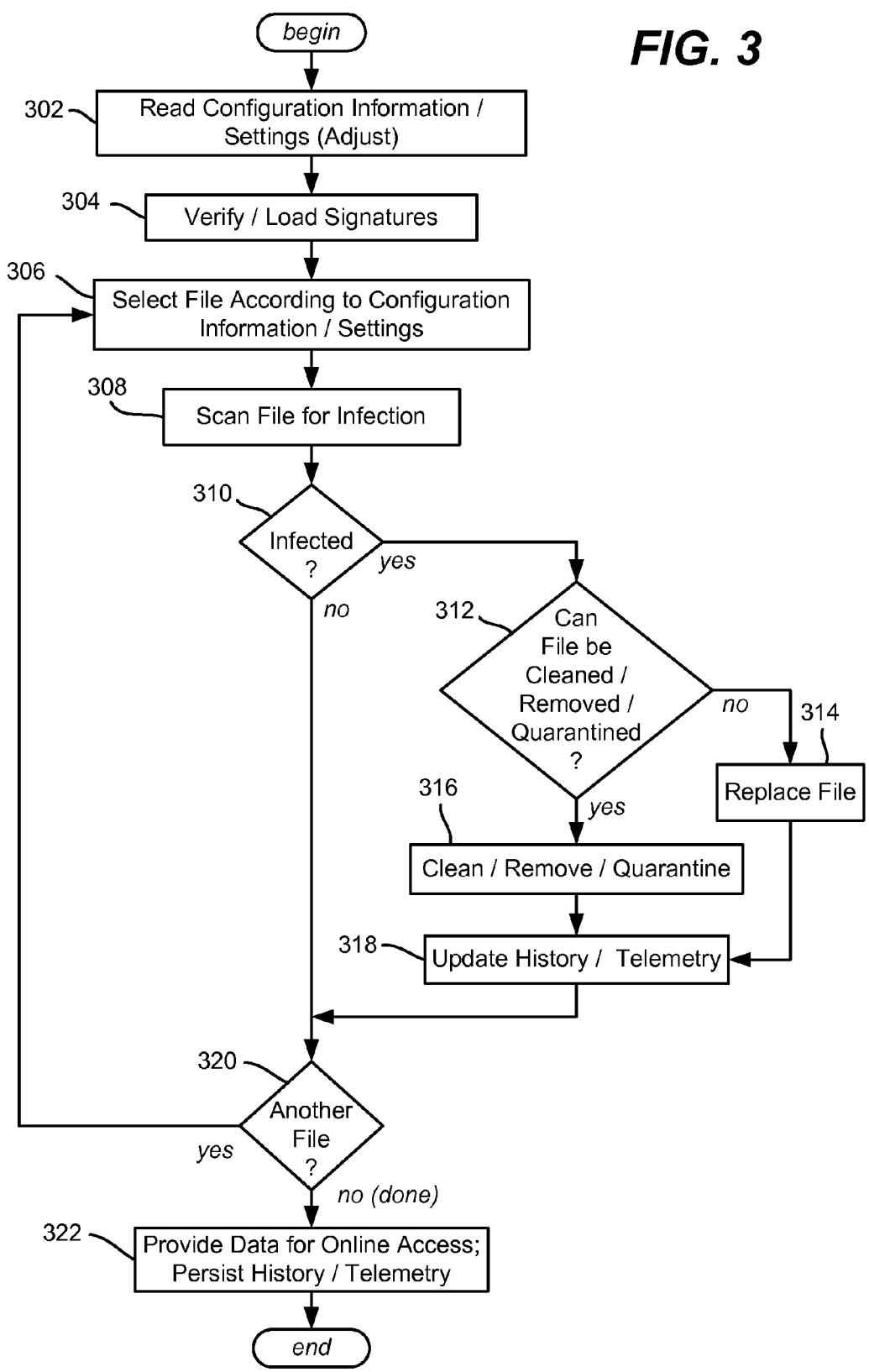
FIG. 3 comprises a flow diagram showing example steps that may be performed by an offline antimalware product.

FIG. 3 comprises a summary of example steps that may be taken by the offline product when run in the offline environment. At step 302, the offline product reads in the configuration information and settings, such as previously stored by the online product. As described above, any of these may be adjusted so that the offline product is not compromised by anything that exists or happened in the online environment.

Step 304 represents loading and verifying the signatures, which in one implementation the online product or other program regularly updates. In this way, the offline product can scan and remediate without needing the user to download and copy an updated new set of antimalware signatures to the offline media. Step 304 also represents verifying the integrity of the digitally signed, installed antimalware signatures by performing an integrity check on them before load. Note that although not explicitly shown in FIG. 3, it in is understood that the offline operations may be aborted and the user appropriately notified if the integrity check fails.

The next steps represents the malware scan, e.g., looking for malware signatures within the file contents. Step 306 selects the file, which may be according to the configuration information and other settings obtained at step 302; for example, only files with possibly executable code may be selected for scanning. The selection also is likely influenced by information in the signatures loaded in step 304.

The selected file is then scanned for malware at step 308. If infected as evaluated at step 310, the file may be cleaned, removed or quarantined (step 316), e.g., as specified in the configuration information and other settings. As described above, in one implementation quarantined files are saved to the host operating system's quarantine cache, which allows the user to restore the quarantined files if desired.

However, certain files, particularly operating system files deemed critical, may not be able to be cleaned and cannot be removed (because doing so will render the host operating system unable to run, at least not run correctly). Such files may be a predetermined set, such as identified in a "critical file" list, and/or ones identified by the online program as being infected (or corrupted) but unable to be removed. If such a file is found (step 312), then it is replaced with a known good copy of the file (step 314). Note that this may include detecting the operating system version so as to restore the correct file version, as described above with reference to FIG. 2.

In one alternative, a host operating system file integrity check may be run instead of (or in addition to) malware signature scanning. For example, a hash of the actual file may be compared against a known good hash, with any difference indicating a corrupt file, which may be replaced by a known good copy. Note that a copy of any infected/corrupt file may be maintained and uploaded for later analysis.

Step 318 represents updating the history and telemetry data, which in this example is only for infected files, and is not communicated through the online environment's communication channel until the scan is complete. It is alternatively feasible to maintain information on each file, such as a count of how many files were processed (or skipped), as well as the information on infected files; also, such data may be maintained for the operating system integrity verification check. Further, the history and telemetry data may be persisted to the host operating system's environment media on some other schedule, such as regularly, continuously instead of (as shown in FIG. 3) only when scanning completes. Still further, the telemetry data may be a subset of the history data and extracted therefrom at a later time, whereby only a superset of the telemetry data (e.g., the history data) need be maintained at this time.

Step 320 repeats the process for other files to be scanned. Step 322 represents saving the history. In one implementation, this may be saved with the host operating system's history, e.g., merged, which allows the user to see the offline product's actions as well as the host operating system's protection program's history in the same place. Other data that may be saved includes a registry entry or the like that is used to inform the online antimalware product that the offline scan completed. Note that when the offline product ends, the system may be automatically reconfigured to reboot from the host operating system.

When the host operating system reboots, the online antimalware product or another program uploads the locally stored telemetry on behalf of the offline product, including any samples to submit for analysis. The online product also reads the registry key that the offline product wrote after the successful scanning/cleaning, and clears the status. If the online protection program later determines that another offline scan is needed, then a message may be sent telling the user that the user needs to run the offline scan.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 4:
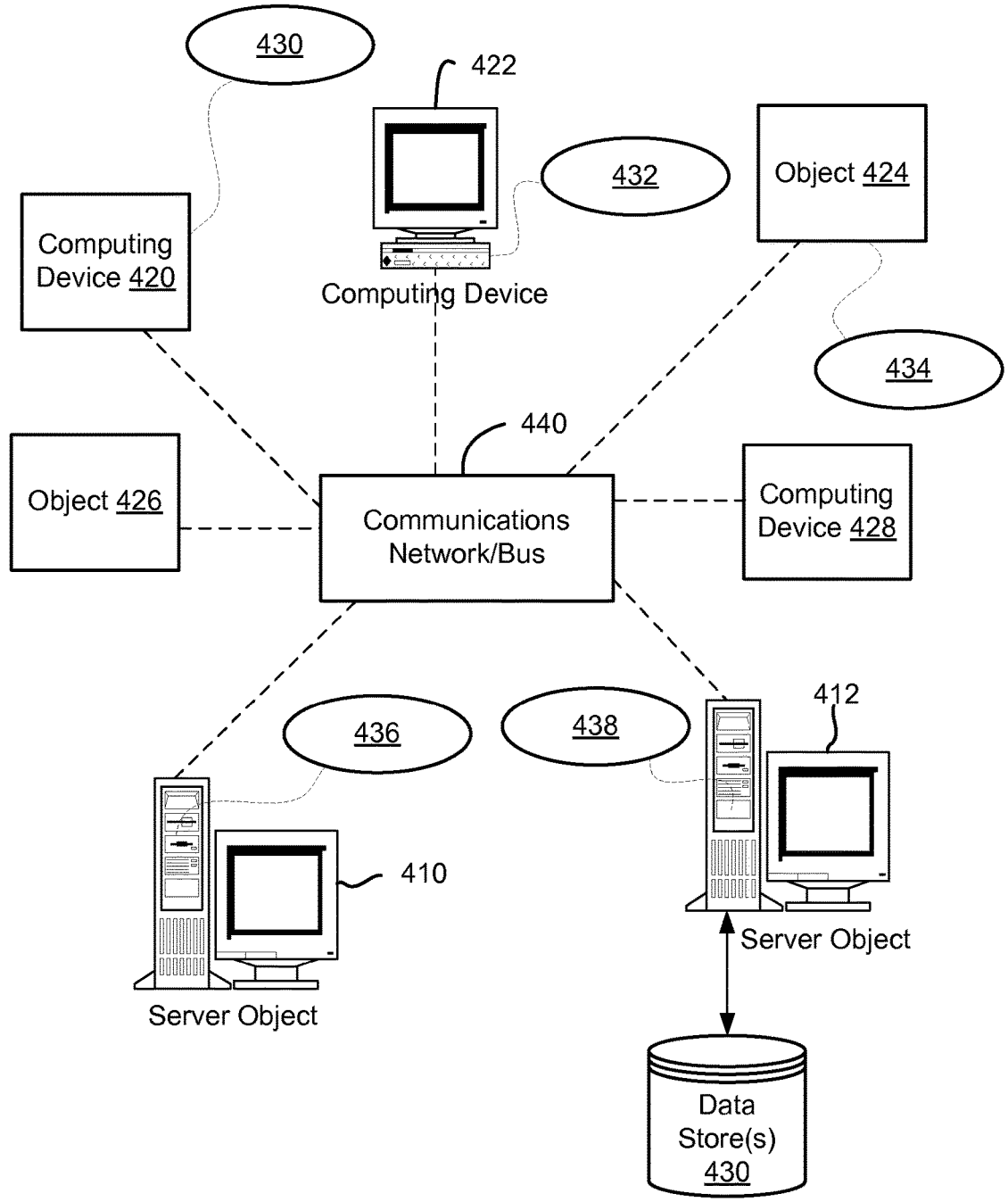
FIG. 4 is a block diagram representing exemplary non-limiting networked environments in which various embodiments described herein can be implemented.

FIG. 4 provides a schematic diagram of an exemplary networked or distributed computing environment. The distributed computing environment comprises computing objects 410, 412, etc., and computing objects or devices 420, 422, 424, 426, 428, etc., which may include programs, methods, data stores, programmable logic, etc. as represented by example applications 430, 432, 434, 436, 438. It can be appreciated that computing objects 410, 412, etc. and computing objects or devices 420, 422, 424, 426, 428, etc. may comprise different devices, such as personal digital assistants (PDAs), audio/video devices, mobile phones, MP3 players, personal computers, laptops, etc.

Each computing object 410, 412, etc. and computing objects or devices 420, 422, 424, 426, 428, etc. can communicate with one or more other computing objects 410, 412, etc. and computing objects or devices 420, 422, 424, 426, 428, etc. by way of the communications network 440, either directly or indirectly. Even though illustrated as a single element in FIG. 4, communications network 440 may comprise other computing objects and computing devices that provide services to the system of FIG. 4, and/or may represent multiple interconnected networks, which are not shown. Each computing object 410, 412, etc. or computing object or device 420, 422, 424, 426, 428, etc. can also contain an application, such as applications 430, 432, 434, 436, 438, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 4, as a non-limiting example, computing objects or devices 420, 422, 424, 426, 428, etc. can be thought of as clients and computing objects 410, 412, etc. can be thought of as servers where computing objects 410, 412, etc., acting as servers provide data services, such as receiving data from client computing objects or devices 420, 422, 424, 426, 428, etc., storing of data, processing of data, transmitting data to client computing objects or devices 420, 422, 424, 426, 428, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 440 or bus is the Internet, for example, the computing objects 410, 412, etc. can be Web servers with which other computing objects or devices 420, 422, 424, 426, 428, etc. communicate via any of a number of known protocols, such as the hypertext transfer protocol (HTTP). Computing objects 410, 412, etc. acting as servers may also serve as clients, e.g., computing objects or devices 420, 422, 424, 426, 428, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 5 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 5:
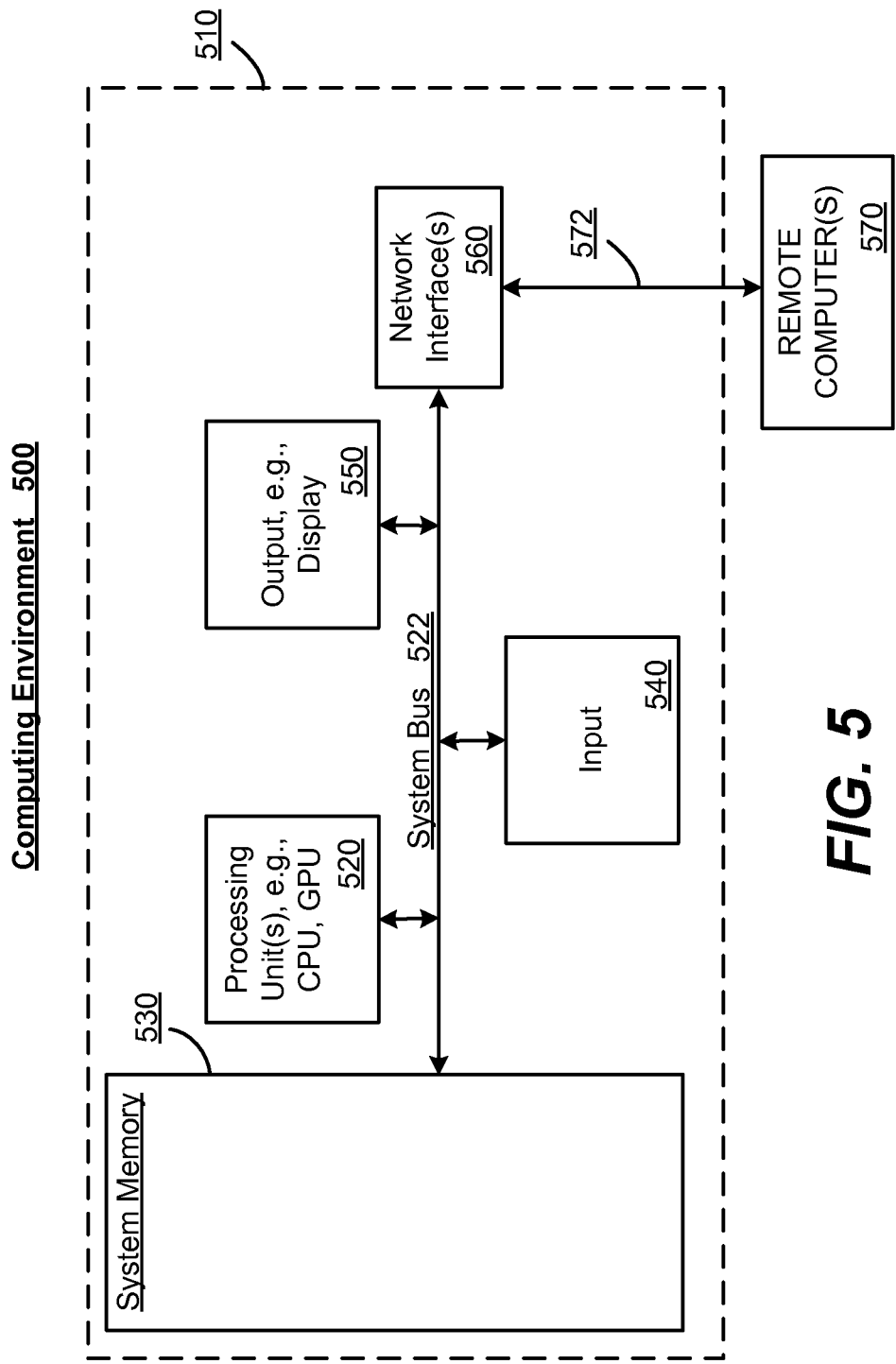
FIG. 5 is a block diagram representing an exemplary non-limiting computing system or operating environment in which one or more aspects of various embodiments described herein can be implemented.

FIG. 5 thus illustrates an example of a suitable computing system environment 500 in which one or aspects of the embodiments described herein can be implemented, although as made clear above, the computing system environment 500 is only one example of a suitable computing environment and is not intended to suggest any limitation as to scope of use or functionality. In addition, the computing system environment 500 is not intended to be interpreted as having any dependency relating to any one or combination of components illustrated in the exemplary computing system environment 500.

With reference to FIG. 5, an exemplary remote device for implementing one or more embodiments includes a general purpose computing device in the form of a computer 510. Components of computer 510 may include, but are not limited to, a processing unit 520, a system memory 530, and a system bus 522 that couples various system components including the system memory to the processing unit 520.

Computer 510 typically includes a variety of computer readable media and can be any available media that can be accessed by computer 510. The system memory 530 may include computer storage media in the form of volatile and/or nonvolatile memory such as read only memory (ROM) and/or random access memory (RAM). By way of example, and not limitation, system memory 530 may also include an operating system, application programs, other program modules, and program data.

A user can enter commands and information into the computer 510 through input devices 540. A monitor or other type of display device is also connected to the system bus 522 via an interface, such as output interface 550. In addition to a monitor, computers can also include other peripheral output devices such as speakers and a printer, which may be connected through output interface 550.

The computer 510 may operate in a networked or distributed environment using logical connections to one or more other remote computers, such as remote computer 570. The remote computer 570 may be a personal computer, a server, a router, a network PC, a peer device or other common network node, or any other remote media consumption or transmission device, and may include any or all of the elements described above relative to the computer 510. The logical connections depicted in FIG. 5 include a network 572, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
    running an offline antimalware product in an offline environment in which a host operating system is not running; and
    within the offline environment in which the host operating system is not running:
        reading data related to an antimalware scan from a storage location into the offline environment, including data that was previously persisted by an online antimalware product when the host operating system was previously running;

performing offline scanning of a set of files that correspond to files accessible via the host operating system environment;

writing information related to results of the offline scanning into one or more other storage locations that are accessible to an online program when the host operating system is later running;

signaling the online antimalware product, when the host operating system is later running, that the offline scanning of the set of files was performed; and replacing one or more pre-determined files of the set of files, which cannot be cleaned or removed, by known non-infected file.

2. The method of claim 1 wherein reading the data related to an antimalware scan into the offline environment comprises reading settings data.

3. The method of claim 1 wherein reading the data related to an antimalware scan into the offline environment comprises reading configuration data.

4. The method of claim 3 wherein reading the data comprises obtaining a location of at least one other storage location corresponding to a signature store, a quarantine store, a results store, or a history store, or any combination of the signature store, the quarantine store, the results store, or the history store.

5. The method of claim 3 wherein reading the data within the offline environment comprises obtaining a location of a signature store associated with the online antimalware product, and further comprising, loading antimalware signatures from the signature store.

6. The method of claim 5 further comprising, verifying integrity of the antimalware signatures.

7. The method of claim 1 wherein writing the information related to the results comprises writing scanning-related history information or scanning-related telemetry information, or both scanning-related history information and scanning-related telemetry information, into the one or more other storage locations.

8. The method of claim 1 wherein writing the information related to the results comprises writing scanning-related telemetry information into the one or more other storage locations, and further comprising, uploading the telemetry information to a security service.

9. The method of claim 1 further comprising, quarantining a file, including writing a copy of the file to a storage location that is accessible to an online program when the host operating system is later running.

10. The method of claim 1 wherein writing the information related to the results comprises writing scanning-related history information into the one or more other storage locations, and further comprising, merging the history information with other history information maintained from at least one previous scan, including a scan previously performed by the online antimalware product.

11. The method of claim 1 wherein writing the information related to the results comprises writing data that indicates that the offline scan was performed to a storage location that is accessible to an online program when the host operating system is later running.

12. In a computing environment, a system comprising:
a processor programmed to execute an offline antimalware product configured to operate in an offline environment, including when a host operating system is not running, in which the offline antimalware product operates in the offline environment to:

read scanning-related data provided by an online program when that online program was previously running on the host operating system;

scan a set of files corresponding to files accessed via the host operating system environment;

signal an online antimalware product, when the host operating system is later running, that the scanning of the set of files was performed;

perform remediation on one or more of the set of files that are detected as infected with malware; and replace at least one pre-determined file of the set of files, which cannot be cleaned or removed while performing remediation, by a known non-infected copy of the at least one pre-determined file.

13. The system of claim 12 wherein the scanning-related data comprises configuration and settings data maintained in a configuration and settings data store in the offline environment's program space.

14. The system of claim 13 wherein the scanning-related data further comprises antimalware signature data maintained in an antimalware signature data store in the offline environment's program space.

15. The system of claim 12 wherein the offline antimalware product performs remediation by quarantining an infected file to a data store that is accessible to a program running on the host operating system, including being accessible for restoring or deleting that file, when that host operating system is later running.

16. The system of claim 12 wherein the offline antimalware product is further configured to write scanning-related results information to a data store that is accessible to a program running on the host operating system when that host operating system is later running.

17. The system of claim 12 wherein the offline antimalware product is further configured to restore an operating system file.

18. One or more computer storage devices having computer-executable instructions, which when executed perform steps, comprising:

downloading antimalware signatures to a data store via a program that runs on a host operating system;

halting operation of the host operating system by booting a computer system on which the host operating system runs into an offline computing environment;

running an antimalware product in the offline computing environment, including accessing the antimalware signatures, scanning a set of files corresponding to files that are accessible via the host operating system to detect malware based on the antimalware signatures, and performing remediation on at least one file in which malware was detected;

writing results information to a storage location that is accessible to a program running on the host operating system when that host operating system is later running;

signaling an online antimalware product, when the host operating system is later running, that an offline scanning of the set of files was performed; and in the offline computing environment, replacing the at least one predetermined file that cannot be cleaned or removed with a corresponding non-infected file.

19. The one or more computer storage devices of claim 18 having further computer-executable instructions comprising, uploading, via the program running on the host operating system when that host operating system is later running, at least some of the results information to a remote security service.

20. The one or more computer storage devices of claim 18 wherein writing results information comprises writing data that indicates that the offline scan was performed to a storage location that is accessible to an online program when the host operating system is later running.

\* \* \* \* \*